(12) United States Patent
Adl-Tabatabai (10) Patent No.: US 6,170,083 B1
(45) Date of Patent: Jan. 2, 2001

(54) METHOD FOR PERFORMING DYNAMIC OPTIMIZATION OF COMPUTER CODE

(75) Inventor: Ali-Reza Adl-Tabatabai, Santa Clara, CA (US)

(73) Assignee: Intel Corporation, Santa Clara, CA (US)

( * ) Notice: Under 35 U.S.C. 154(b), the term of this patent shall be extended for 0 days.

(21) Appl. No.: 08/968,547

(22) Filed: Nov. 12, 1997

(51) Int. Cl.[7] ................................................. G06F 9/45
(52) U.S. Cl. ................................................. 717/9; 717/5
(58) Field of Search .............................. 395/709; 717/9

(56) References Cited

U.S. PATENT DOCUMENTS

| | | | |
|---|---|---|---|
| 5,278,985 | 1/1994 | Odnert et al. | 712/244 |
| 5,420,991 | 5/1995 | Konigsfeld et al. | 711/150 |
| 5,421,022 | 5/1995 | McKeen et al. | 712/23 |
| 5,526,499 | 6/1996 | Bernstein et al. | 712/216 |
| 5,659,752 | * 8/1997 | Heisch et al. | 717/4 |
| 5,752,038 | * 5/1998 | Blake et al. | 717/9 |
| 5,828,883 | * 10/1998 | Hall | 717/4 |
| 5,923,883 | * 7/1999 | Tanaka et al. | 717/9 |

OTHER PUBLICATIONS

Cohn–Lowney, Hot Cold Optimization of Large Windows/NT Applications, Proceedings of MICRO29, IEEE, Dec. 1996.*

Hsueh–Gyllenhaal–Hwu, "Java Bytecode to Native Code Translation: The Caffeine Prototype and Preliminary Results", IEEE, Jan. 1996.*

Jens Knoop et al., "Partial Dead Code Elimination," *ACM Sigplan*, Jun. 1994, pp. 147–157.

R. Nigel Horspool and H.C. Ho, "Partial Redundancy Elimination Driven by a Cost–Benefit Analysis," Department of Computer Science, University of Victoria, Canada, date unknown.

Bernhard Steffen, "Data Flow Analysis as Model Checking," *Theoretical Aspects of Computer Software*, Sep. 24–27, 1991, pp. 346–364.

Thomas Ball and James Larus, "Efficient Path Profiling," *IEEE/ACM International Symposium on Microarchitecture*, Dec. 2–4, 1996, Paris, France, pp. 46–57.

Jens Knoop et al., "Lazy Code Motion," *ACM Sigplan*, Jun. 1992, pp. 224–234.

\* cited by examiner

*Primary Examiner*—Tariq R. Hefiz
*Assistant Examiner*—Hoang-Vu Antony Nguyen-Ba
(74) *Attorney, Agent, or Firm*—Blakely, Sokoloff, Taylor & Zafman LLP (57) ABSTRACT

Early Java Virtual Machine implementations executed Java programs very slowly since the Java byte codes were interpreted. Later, Java compilers were introduced to improve performance. To further improve performance, the present invention introduces a method of dynamically optimizing computer code. The method of the present invention first compiles Java byte code into an object code. While compiling, the method introduces instrumentation code into the object code that performs path profiling. Specifically, the path profiling instrumentation code determines which execution paths are executed most often by counting the number of times each possible execution path is executed. When a particular execution path exceeds a threshold value, then that execution path is deemed a "hot" execution path. The hot execution path is then dynamically optimized. The optimized hot path is then executed instead of the original compiled object code for improved performance.

20 Claims, 7 Drawing Sheets

```
Main ( )
{
      ⎧  Instruction 1
      ⎪  Instruction 2
  A  ⎨  Instruction 3
      ⎪  If (condition) then
      ⎩
         {
      ⎧      Instruction 4
  B  ⎨      Instruction 5
      ⎩      Instruction 6
         }
      else
         {
      ⎧      Instruction 7
  C  ⎨      Instruction 8
      ⎩      Instruction 9
         }
      ⎧  Instruction 10
      ⎪  Instruction 11
  D  ⎨  Instruction 12
      ⎩  If (condition) then
         {
      ⎧      Instruction 13
  E  ⎨      Instruction 14
      ⎩      Instruction 15
         }
      ⎧  Instruction 16
  F  ⎨  Instruction 17
      ⎩  Instruction 18
}
```

Figure 6b 1 2 3 4
Paths

*Figure 7*

METHOD FOR PERFORMING DYNAMIC OPTIMIZATION OF COMPUTER CODE

FIELD OF THE INVENTION

The present invention relates to the field of computer software optimization. In particular, the present invention relates to a method of dynamically optimizing compiled Java programs using the technique of path profiling.

BACKGROUND OF THE INVENTION

Most computer programs exist as compiled object code. The compiled object code is designed to operate only on one particular operating system running on one particular computer processor architecture. To distribute a program for several different computer architectures the original source code must be compiled into object code for each different computer processor architecture and each different operating system.

To create a highly portable programming environment, Sun Microsystems, Inc. introduced Java. Java is an object oriented programming language that is compiled from a well-defined source code into Java byte codes. The Java byte codes are designed to execute on a "Java Virtual Machine." A Java Virtual Machine is not an actual hardware platform. Instead, a Java Virtual Machine is a low level software emulator that can be implemented on many different computer processor architectures and under many different operating systems. Thus, a single compiled Java program can be distributed to any computer processor architecture and operating system that has a Java Virtual Machine implementation available.

Early Java Virtual Machines were implemented as interpreters. In a Java interpreter, each Java byte code is examined and a corresponding operation is performed in the Java Virtual Machine. Although Java byte code interpreters achieve the goal of having a portable programming environment, Java interpreters suffer from slow performance.

To improve the performance of Java Virtual machines, Java compilers were created. Java compilers translate the Java byte codes into native computer instructions for the particular computer architecture that the Java Virtual Machine is running on. Then, the computer processor runs the Java program by directly running the compiled native code. Such compiled Java programs execute much faster than Java programs that are executed using a Java interpreter.

In many applications Java programs are distributed in real time across a computer network. For example, a user may download a Java program from a server into a local client computer system. The user then typically wishes to immediately execute the downloaded Java program. To provide an immediate response to the user, a Java byte code compiler immediately compiles the Java program into native processor code. This technique is known as "Just-In-Time" compiling. Since the Just-In-Time compilation must be performed very quickly, the Just-In-Time compilation is usually not well optimized. Thus, although a Just-In-Time compiled Java program executes faster than an interpreted Java program, such Just-In-Time compiled Java programs can be improved further.

SUMMARY OF THE INVENTION

The present invention introduces a method of optimizing computer code. The method of the present invention first compiles source code into an object code. While compiling, the method introduces instrumentation code into the object code that performs path profiling. The path profiling instrumentation code counts the number of times each execution path is executed to determine a "hot" execution path. The hot execution path is then dynamically optimized.

BRIEF DESCRIPTION OF THE DRAWINGS

The objects, features and advantages of the present invention will be apparent to one skilled in the art, in view of the following detailed description in which:

FIG. 6b illustrates a graphical path diagram of the possible data paths through basic blocks of code from FIG. 6a.

DETAILED DESCRIPTION OF THE PREFERRED EMBODIMENT

A method and apparatus for dynamically optimizing compiled computer programs is disclosed. In the following description, for purposes of explanation, specific nomenclature is set forth to provide a thorough understanding of the present invention. However, it will be apparent to one skilled in the art that these specific details are not required in order to practice the present invention. For example, the present invention has been described with reference to Java object-oriented programming language. However, the same techniques and teachings can easily be applied to other types of compiled object code.

Java programs (also known as Java class files) are often distributed in a computer network environment. For example, an Internet World-Wide-Web (WWW) site may store a Java class file consisting of Java byte codes. To run such a Java class file in a computer network environment, a user first accesses a computer server to download the desired Java class file into a client computer system where the Java class file is then executed.

Figure 1:
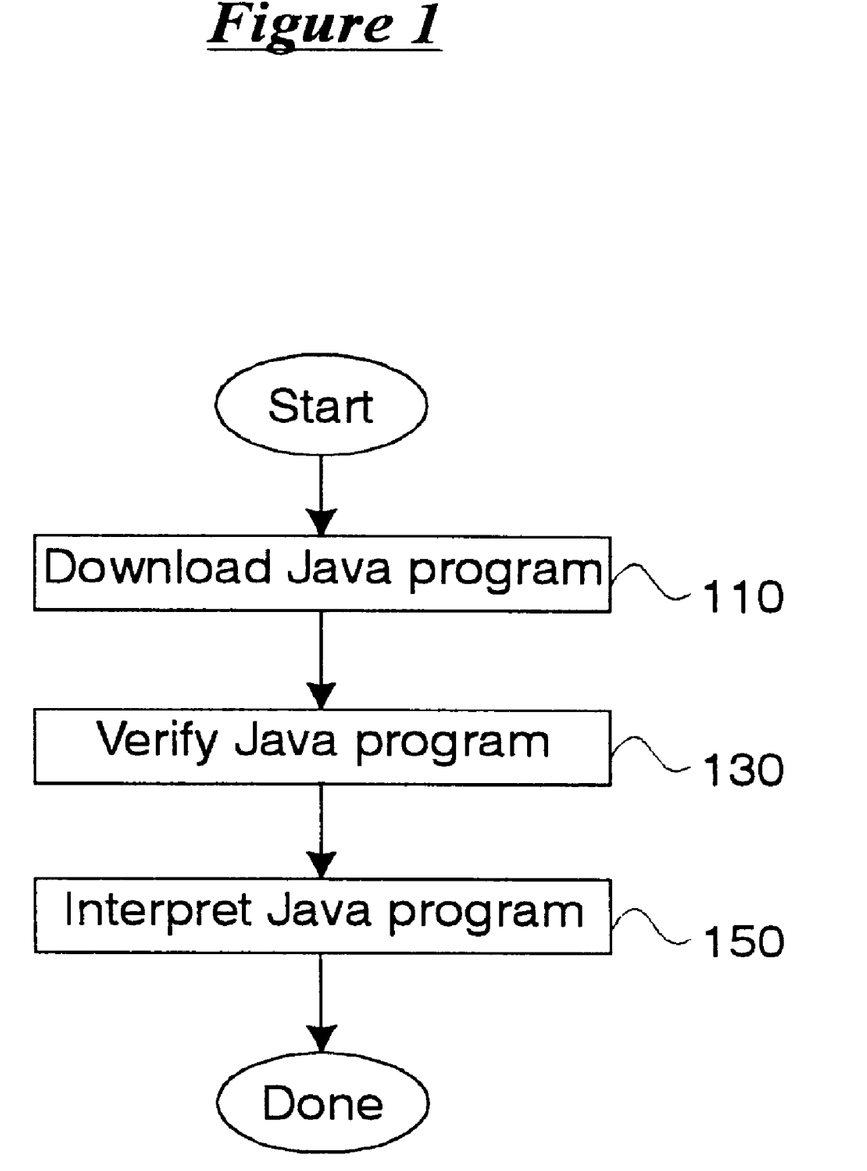
FIG. 1 illustrates the list of steps in downloading and running a Java program in a Java Virtual machine with an interpreter.
Figure 3:
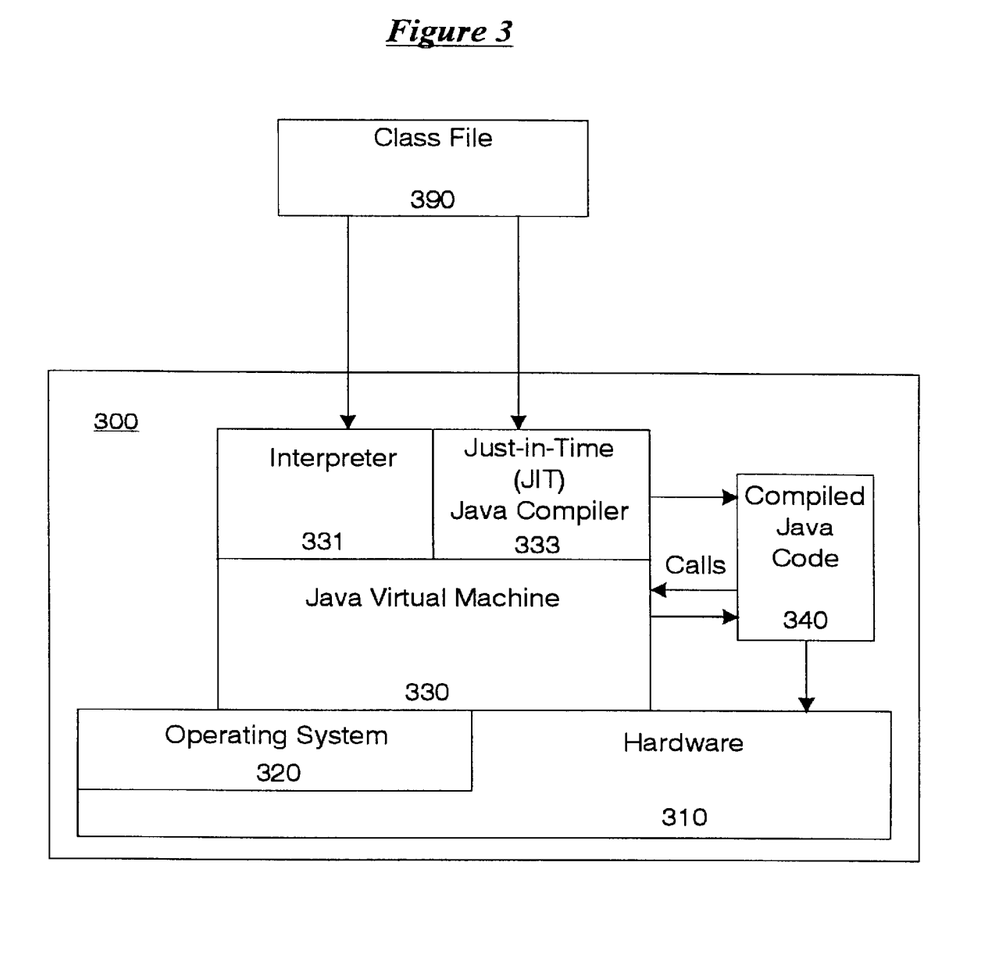
FIG. 3 illustrates a block diagram of a Java Virtual Machine on a client computer system.

An example of running a Java class file in a computer network environment is provided with reference to FIG. 1 and FIG. 3. FIG. 1 illustrates a set of steps that describe how a Java class file can be run by a user that has a client computer system with a Java Virtual machine interpreter. FIG. 3 illustrates, in block diagram form, the elements of a client computer system equipped to interpret Java class files.

To run a Java class file in a computer network environment, a user first accesses a computer server and downloads the desired Java class file into a client computer system as stated in step 110 of FIG. 1. FIG. 3 illustrates a block diagram of a client computer system that can interpret a Java class file. In client computer system 300, the computer hardware 310 is controlled by an operating system 320. The client computer system 300 includes a Java Virtual Machine 330 implementation for running Java class files. The Java Virtual Machine 330 running on client computer system 300 relies on services from the operating system 320 and the underlying computer hardware 310. To interpret Java class files the Java Virtual machine 330 uses a Java interpreter 331.

After the Java class file has been downloaded, then the Java class file passed to the Java Virtual machine 330 in the client computer system 300. The Java Virtual machine 330 first verifies the Java class file at step 130. The verification of the Java class file ensures that the program will not cause security violations nor will it harm computer system resources.

After the Java program has been verified, the Java interpreter 331 of the Java Virtual Machine 330 begins interpreting the Java bytes codes in order to execute the Java application as stated in step 150. The Java interpreter 331 interprets the Java byte codes one by one. Since the Java interpreter 331 interprets Java byte codes that are not native processor code, such Java interpreting tends to be slow. To improve performance of Java programs, Java "Just-In-Time" compilation was created.

Figure 2:
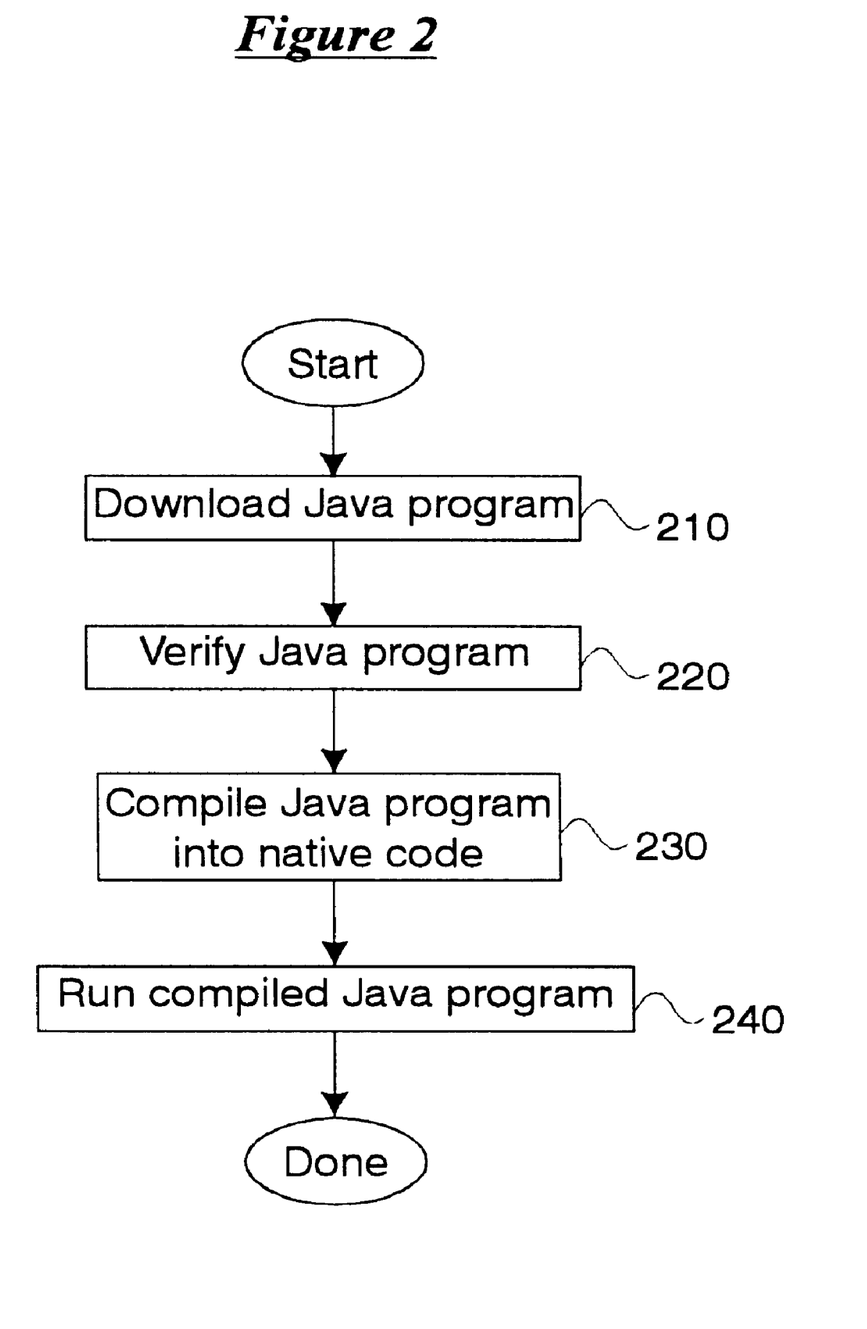
FIG. 2 illustrates a flow diagram that list the steps of downloading, compiling, and running a Java program in a Java Virtual Machine that compiles the code before execution.

FIGS. 2 and 3 will be used to describe how a Java class filed can be compiled and then executed. FIG. 2 illustrates the steps performed in downloading, compiling, and executing a Java program. Initially, at step 210, the user accesses a Java class file on a computer network and downloads the Java class file into the local client computer system 300. The Java Virtual Machine 330 then verifies the Java class file at step 220.

After verification of the Java class file, a Just-In-Time Java compiler 333 compiles the Java class file at step 230. Specifically, the Just-In-Time Java compiler 333 compiles the Java byte codes into native code for the processor of client computer system 300. Referring to FIG. 3, when a Java class file has been processed by the Just-In-Time Java compiler 333, the Just-In-Time Java compiler 333 creates compiled Java code 340. The compiled Java code 340 is then directly executed by the computer hardware 310 at step 240. To maintain the state of the Java Virtual machine 330, the compiled Java code 340 makes calls into the Java Virtual machine 330.

A Path Optimizing Just In Time Java Compiling System

The present invention introduces a new method of executing Java class files. The present invention combines techniques of Just-In-Time compilation of Java class files and path profiling optimization. Specifically, each Java class file is first compiled as necessary before execution. Then, as the compiled Java program executes, an execution path profile is built to determine which execution paths are executed most often. When a particular execution path is determined to be executed very often, that particular execution path is then dynamically optimized. The present invention will be described with reference to FIGS. 4, 5, 6a, 6b, and 7.

Figure 4:
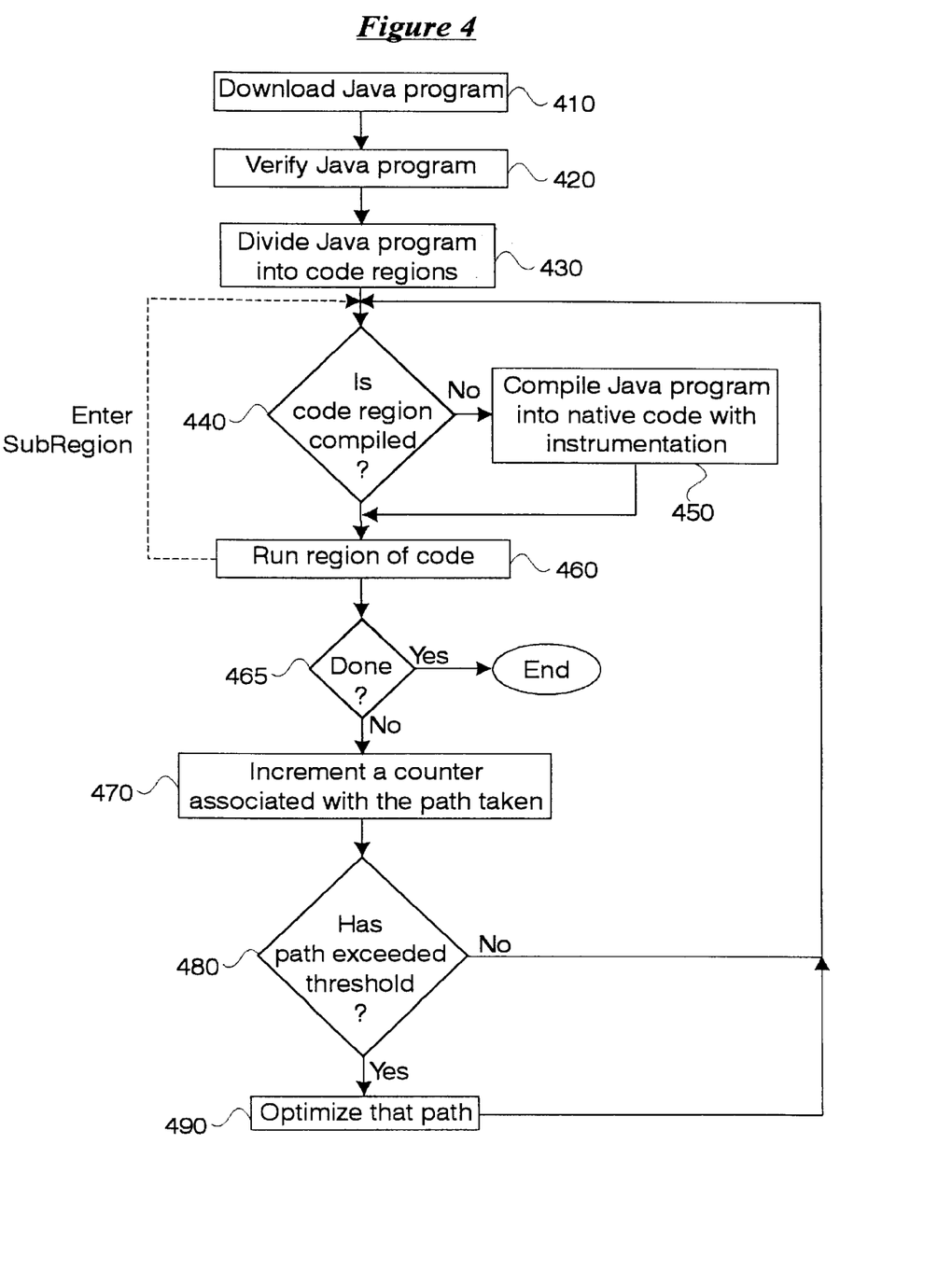
FIG. 4 list the steps of downloading, compiling, running, and optimizing a Java program according to the teachings of the present invention.

FIG. 4 illustrates an overall flow diagram of the Java class file execution and optimization method of the present invention. Initially, at step 410, a Java class file is downloaded into a local client computer system. The Java Virtual Machine of the client computer system then verifies the Java class file at step 420 to ensure that the Java class file is safe to execute.

Code Regions

Next, the present invention divides the Java class file into code regions at step 430. The present invention defines a code region as:

1) A method body of code; or
2) A program loop.

This definition is recursive since each loop within a method body is a region and each loop within a loop is a region.

Figure 5:
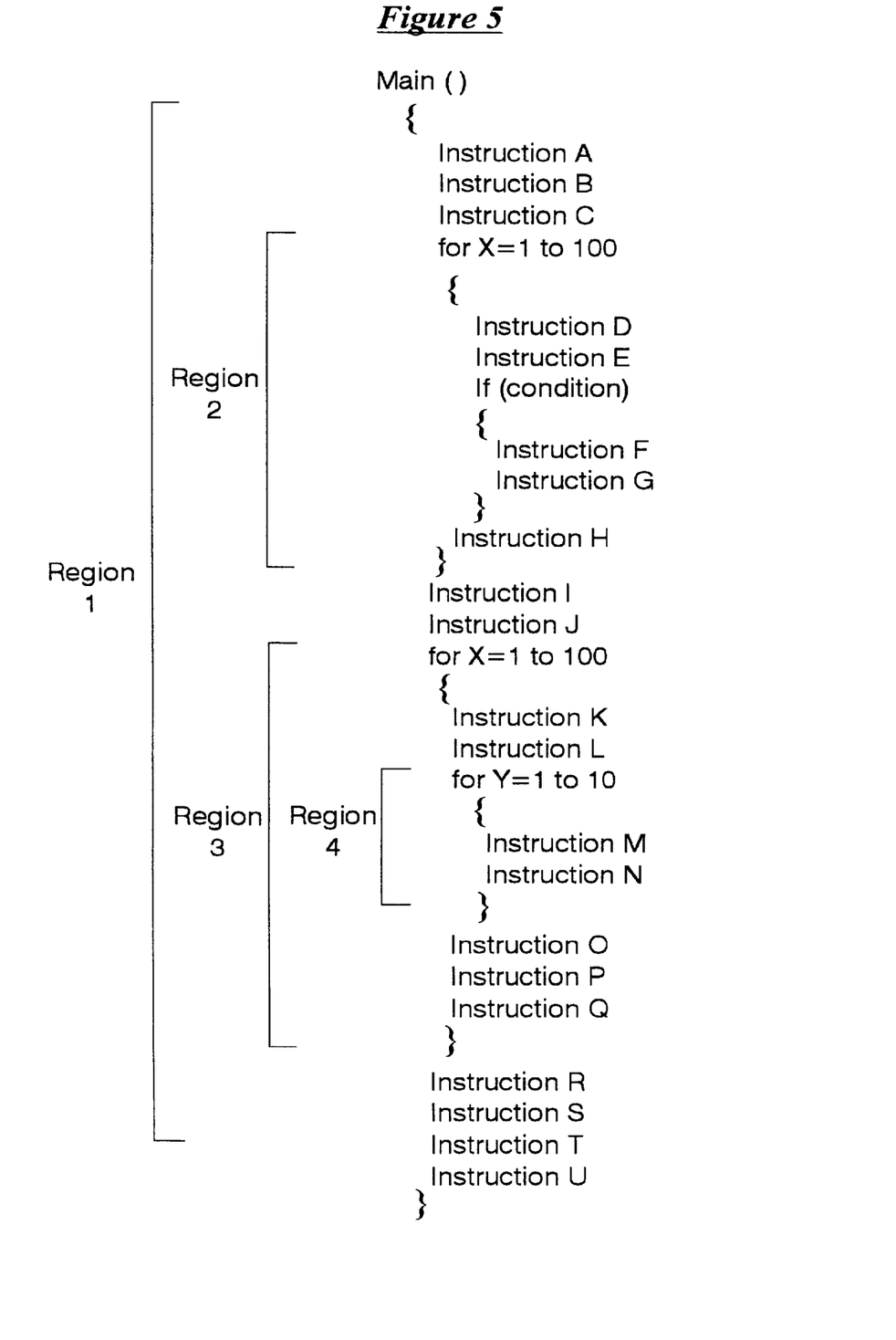
FIG. 5 illustrates example source pseudocode that has been divided into code regions.

FIG. 5 illustrates an example of pseudocode that has been divided into code regions. Referring to FIG. 5, the main method body is a first region of code labeled region 1. The main body region begins with instructions A, B, and C. After instructions A, B, and C there is a first program loop. The program loop includes instructions D, E, an "if" condition including instructions F and G, and a final instruction H. This program loop within the main method body comprises a second region labeled as region 2. After region 2, there are two more instructions—instruction I and J—that are part of region 1. After instruction J there is another program loop. The program loop after instruction J is a third region of code defined as region 3. Within region 3 there is yet another program loop. That program loop defines yet another region of code known as region 4. After the program loop of region 3 there are four more instructions R, S, T, and U and then the first region of code ends.

Referring back to FIG. 4, after a Java class file has been divided into code regions, the Java Virtual Machine then begins to execute the code. Before executing a region of code, the code region needs to be compiled first. Thus, at step 440, when a region of code begins to execute the method of the present invention first determines if the code region has yet been compiled. If the code region has not yet been compiled, then the method proceeds to step 450 where that region of code is compiled into native processor code along with some instrumentation that will be described later. Only that particular region of code that will be executing is compiled into native code. Any sub-regions of code that are within the code region to be executed are not compiled yet. Instead, hooks are left in the compiled code to jump to those code regions that have not yet been compiled. Thus, returning to FIG. 4 after the region of code has been compiled then that region of code is then executed at step 460.

When the region of code is executing and encounters a jump to a sub-region of code, the method proceeds back to step 440. At step 440, the present invention again determines if this region of code has been compiled yet. If the region has not been compiled yet, then region of code will be compiled as stated in step 450. Otherwise, if that region of code has been compiled then that region of code begins executing at step 460.

A description of code region execution is best provided by an example. An example of code region execution will be provided with reference to FIGS. 4 and 5. Referring back to step 430 of FIG. 4, each Java program is divided into code regions. FIG. 5 provides an example of code divided into code regions where a section of pseudocode has been divided into four regions. When the code of FIG. 5 begins execution, region 1 is initially selected for execution.

The first step of executing the code in FIG. 5 is to determine if this code region has already been compiled. At the initial execution, the code is not yet compiled thus region 1 must be compiled. Referring to step 450, the Java code is compiled into native code with additional instrumentation. Specifically, instructions A, B, C, I, J, and instructions R, S, T, U of region 1 are compiled into native code. Furthermore, hooks are placed into the compiled code of region 1 such that region 2 and region 3 will be executed after instructions C and J respectively. Furthermore, the compiled code will also include path profiling instrumentation hooks that will be described later.

When region 1 begins executing, compiled instructions A, B, and C will execute and then a hook to region 2 will be encountered. At this point region 2 is entered as a sub-region. Referring back to FIG. 4, the method of the present invention first determines if this code region is compiled. Since region 2 has not yet been compiled, region 2 needs to be compiled into native code with instrumentation. Thus, all the instructions within the loop of region 2 are compiled into native code. Region 2 is then executed. After region 2 has completed execution, the execution path returns back to region 1 which then continues execution. The execution of the code regions continues along in this manner.

Path Profiling Optimization

For each region of code that is defined the present invention performs path profiling. Path profiling consists of determining all the possible execution paths through a region of code and then determining which execution paths are executed. When a particular execution path in a code region is determined to be executed very often (a "hot" path), then that particular execution path will be optimized such that the execution of that region of code will be optimized as long the execution flow follows the optimized execution path.

Basic Blocks and Execution Paths

Figure 6A:
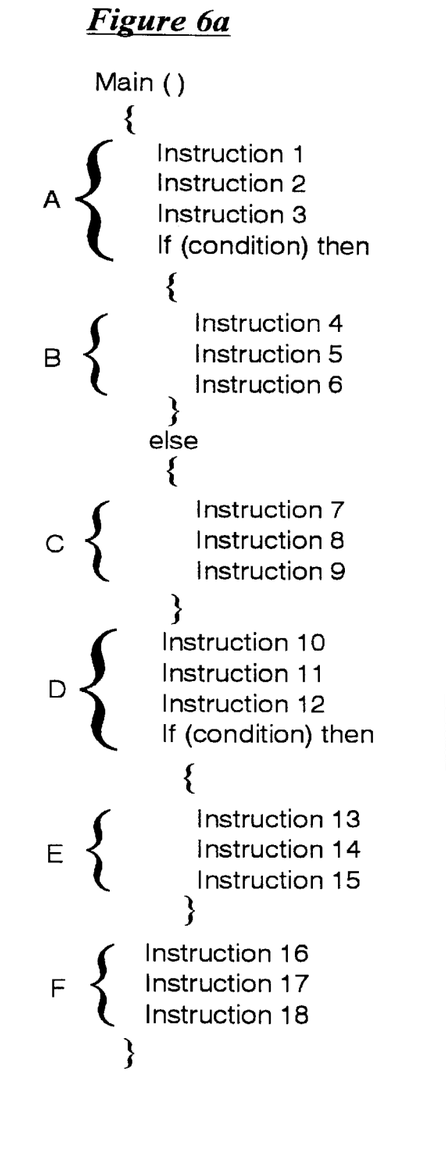
FIG. 6a illustrates a listing of example code divided into basic blocks of code.

An example of path profiling will be given with reference to FIGS. 6a and 6b. FIG. 6a illustrates a region of pseudocode. The region of pseudocode depicted in FIG. 6a contains no loop. Accordingly, the region of code in FIG. 6a consists of a single code region that contains no sub-regions. (This example contains no sub-regions in order to simplify the example.)

To perform path profiling, each region of code is divided into basic blocks of code. A basic block of code is defined as a set of instructions in between branch instructions. Referring again to FIG. 6a, the code has been divided into six basic blocks labeled A through F. The first basic block of code (basic block A) consists of instructions 1, 2, 3, and the conditional "if" branch instruction following instruction 3. The next basic block of code (basic block B) consists of instructions 4, 5, and 6 that are performed if the conditional branch of basic block A is true. The next basic block of code (basic block C) comprises instructions 7, 8, and 9 that are executed if the condition in the conditional branch of basic block A is false. The next basic block (basic block D) comprises instructions 10, 11, 12, and a second conditional "if" branch instruction. The next basic block of instructions (basic block E) comprises instructions 13, 14, and 15 that are executed if the second conditional branch is true. Finally the last basic block of instructions (basic block F) comprises instructions 16, 17, and 18 that are always executed at the end of the code region.

Figure 6B:
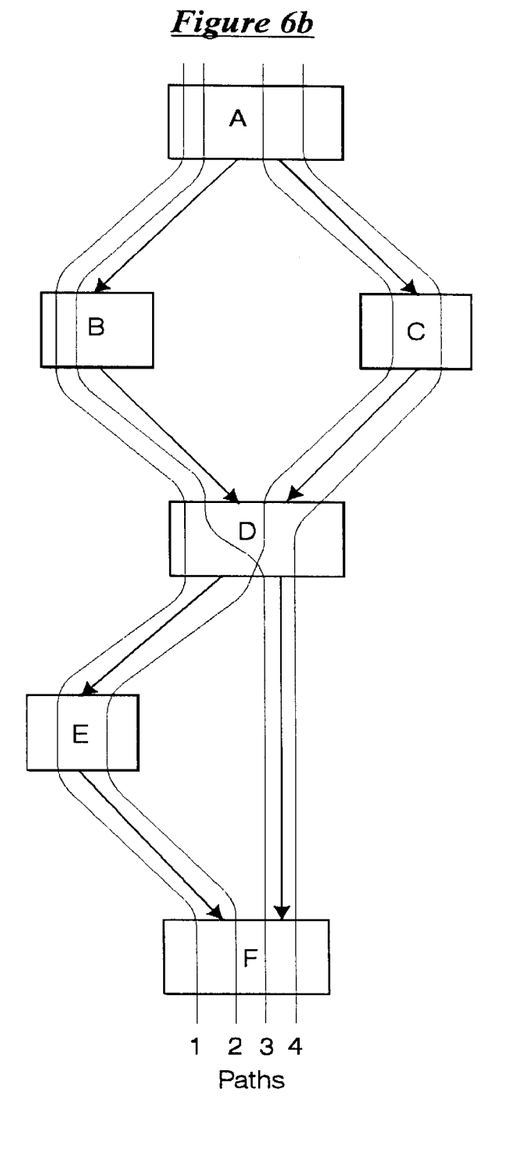

The six basic blocks of code (basic blocks A, B, C, D, E, and F) from the code region in FIG. 6a are illustrated graphically in FIG. 6b. As illustrated in FIG. 6b there is a first basic block A and then there are basic blocks B and C which may be executed depending on the first condition branch. After basic blocks B and C there is a basic block code D which is always executed. The end of basic block D has a branch instruction. Basic block E is executed after by basic block D only if the second condition is true. Finally, basic block of code F is always executed at the end of the code region. Depending on the conditional branching of a code region, several different execution paths may be followed in each code region. In the example code of FIG. 6a (depicted graphically as FIG. 6b), there are four possible different paths that may be executed. A first path that may be executed would be basic blocks A, B, D, E, F. A second path that may be executed would be basic blocks A, C, D, E, F. A third path that may be executed would be basic blocks A, B, D, F. And the final path that may be executed would be basic blocks A, C, D, F. Each possible execution path is labeled 1 through 4 respectively.

Execution Path Counters

When each code region is compiled by the Just-In-Time compiler 333 of the present invention, the Just-In-Time compiler 333 introduces instrumentation code after each basic block of code that counts and determines which basic block is being executed. At the end of the code region, a path profile counter determines which of the possible execution paths was followed. Thus, after each region of code is executed the present invention will know which execution path was followed.

Referring back to FIG. 4 after each region of code is executed at step 460 the method then determines whether or not the Java program has completed execution at step 465. If the program has completed execution then the program is completely done. If not, then an execution path counter associated with the followed execution path is incremented at step 470. The counter associated with the taken execution path is compared with a threshold value at step 480. If the execution path counter exceeds the threshold value, then that followed execution path is optimized at step 490. The optimized execution path contains no branches such that the optimized execution path will execute very quickly. Other optimization techniques that may be used in the optimization of the selected path include loop unrolling, dead code removal, common subexpression elimination, optimized register allocation, optimized instruction scheduling, copy propagation, constant propagation, and constant folding. After optimization, program execution then resumes at step 440.

Path Profiling Example

An example of how an execution path profile is maintained and used to optimize program code will be provided with reference to FIGS. 4, 6a, 6b, and 7. Referring to step 460, each region of code is executed after the region of code has been compiled. After the execution of a code region, the method of the present invention determines at step 465 whether the Java class file has completed execution. If the program has completed execution, then program execution ends. Otherwise, a path counter associated with the taken execution path of the code region is incremented at step 470.

For example, referring to FIG. 6b, if the region of code follows the execution path of basic blocks A, B, D, E, and F then counter 1 associated with the first possible execution path will be incremented. Referring back to FIG. 4 the execution path counter is then compared with a threshold value at step 480. If the execution path counter does not exceed the threshold, then the Java program continues execution at the next region of code by returning to step 440.

However, if the execution path counter does exceed the threshold value then the method of the present invention proceeds to step 490 where an optimizing compiler generates an optimized set of code for that particular execution path. Specifically, the basic blocks of instructions of the execution path are compiled in that order. The optimized execution path code will execute very quickly provided that the optimized "hot" path is followed. However, there are hooks in the optimized execution path such that if the optimized path is not followed, then the program will be able to branch back to the original compiled code region.

Figure 7:
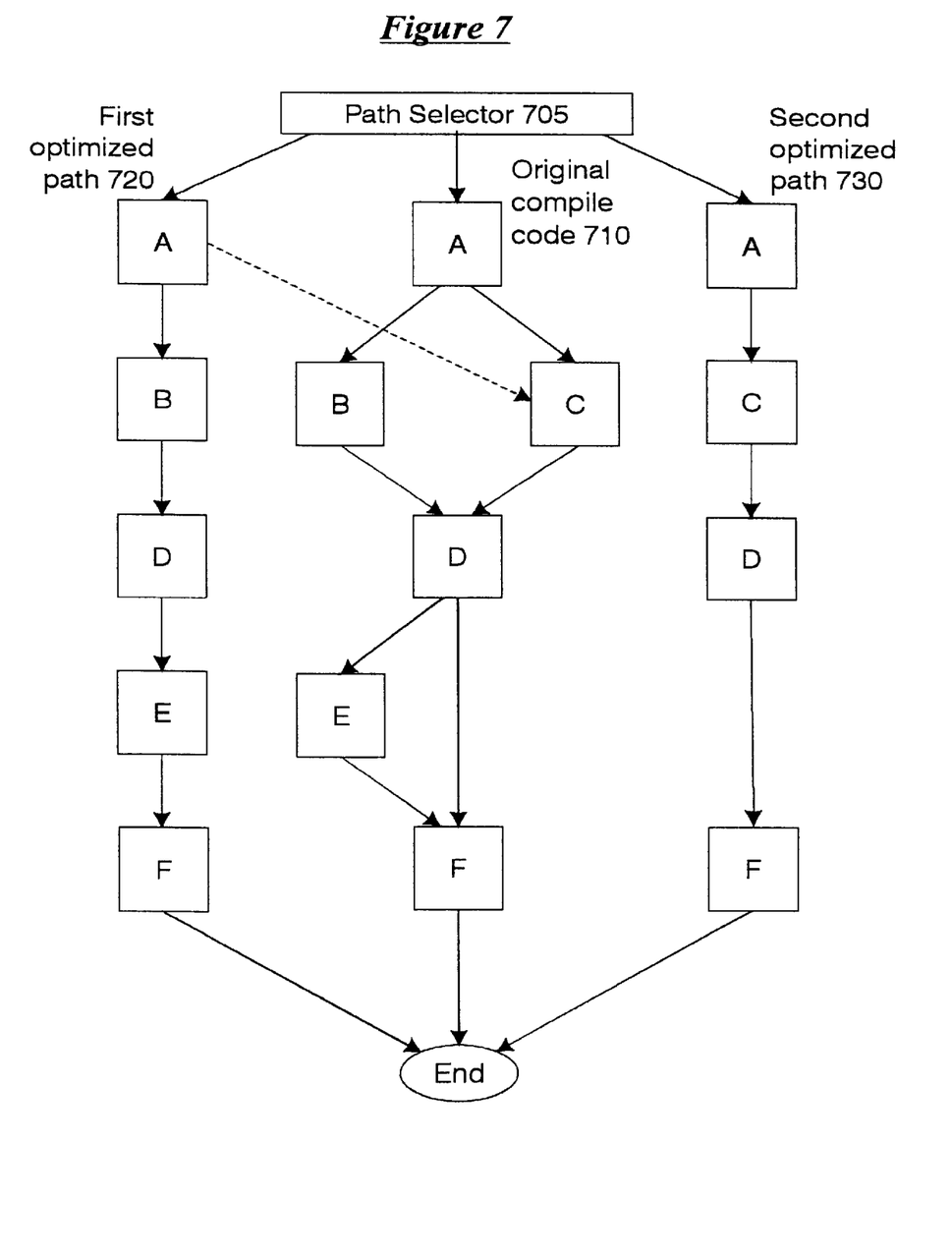
FIG. 7 graphically illustrates a section of code that has been compiled and then later optimized once a hot execution path has been selected.

FIG. 7 graphically illustrates the original compiled code 710 of the code region of FIGS. 6a and 6b. The original compiled code 710 is preceded by a "path selector" 705 that selects an execution path to follow for the code. The original compiled code 710 includes several different possible paths that may be executed. Specifically, the original compiled code 710 down the center path matches the diagram of FIG. 6b.

After the original compiled code 710 has executed a sufficient number times such that execution path 1 has exceed the threshold value, the present invention will create the first optimized path 720 as illustrated in FIG. 7. The first optimized path 720 comprises the basic blocks compiled in the order of A, B, D, E, F. Between the basic block there are hooks such that if the code does not exactly follow the optimized path, then the code will branch back to the original compiled code 710. For example, if after executing basic block A along the first optimized path 720 the code determines that it should proceed to basic block C then the code will branch back to basic block C in the original compiled code 710 as illustrated in FIG. 7.

As the region of code continues to execute, a different execution path may exceed the threshold value. For example, referring to FIG. 6b, path 4 along basic blocks A, C, D, F may exceed the threshold value. In such a case, the method of the present invention will create a second optimized path along basic blocks A, C, D, and F. This second optimized path 730 is illustrated in FIG. 7. When this particular region of code is executed, the path selector 705 will now select the second optimized path 730 as the execution path to execute. Again, if the code does not exactly follow the second optimized path 730 then the code will branch back to the original compiled code 710. To prevent interruption of the executing Java class file, the optimization of "hot" paths may be performed by a second thread that runs concurrently with the execution of the Java class file.

The foregoing has described a method for performing dynamic optimization of computer code. It is contemplated that changes and modifications may be made by one of ordinary skill in the art, to the materials and arrangements of elements of the present invention without departing from the scope of the invention.

What is claimed is:

1. A method of comprising:
   dividing a source code into source code regions, each source code region comprises a method or a program loop;
   compiling a source code region into an object code, said compiling including placing path profiling instrumentation into said object code such that path profiling is performed for each code region;
   executing said object code, said executing comprising counting taken execution paths to determine a hot execution path; and
   dynamically optimizing said hot execution path by selecting a first path through the source code regions as the hot execution path and optimizing the first path; and
   subsequently identifying a second path as the hot execution path and optimizing the second path in response to the second path becoming more frequently used than the first path.

2. The method as claimed in claim 1 wherein compiling comprises compiling a source code region only when said source code region is needed for execution.

3. The method as claimed in claim 1 wherein executing comprises executing said instrumentation code to determine said hot execution path.

4. The method as claimed in claim 1 wherein dynamically optimizing comprises recompiling said source code region.

5. The method as claimed in claim 4 wherein said recompiling of said source code comprises compiling said hot execution path through said source code region.

6. The method as claimed in claim 1 wherein counting taken execution paths to determine a hot execution path comprises comparing a number of times a particular execution path has been taken to a threshold.

7. The method of claim 1, wherein each loop within a method body is a region and each loop within a loop is a region.

8. A machine-readable medium having stored thereon data representing sequences of instructions, said sequences of instructions which, when executed by a processor, cause said processor to:
   divide a program into code regions, each code region comprises a method body or a program loop;
   compile a first code region into a first object code region, said compiling including placing path profiling instrumentation into said first object code region such that path profiling is performed for each code region;
   execute said first object code region, said executing including counting taken execution paths in said first object code region; and
   dynamically optimize said hot execution path by
   selecting a first path through the source code regions as the hot execution path and optimizing the first path; and
   subsequently identifying a second path as the hot execution path and optimizing the second path in response to the second path becoming more frequently used than the first path.

9. The machine-readable medium of claim 8 wherein said sequences of instructions when executed by said processor further cause said processor to delay compilation of code regions until the code regions are needed for execution.

10. The machine-readable medium of claim 8 wherein said sequences of instructions when executed by said processor further cause said processor to execute the path profiling instrumentation to determine said hot execution path.

11. The machine-readable medium of claim 8 wherein the dynamic optimization of said hot execution path further comprises recompiling source code regions associated with said hot execution path.

12. A method comprising:
   dividing a source code into source code regions, each source code region comprises a method or a program loop;
   compiling a source code region into an object code, said compiling including placing path profiling instrumentation into said object code such that path profiling is performed for each code region;
   executing said object code, said executing comprising counting taken execution paths to determine a hot execution path;
   selecting a first path through the source code regions as the hot execution path and optimizing the first path; and
   subsequently identifying a second path as the hot execution path and optimizing the second path in response to the second path becoming more frequently used than the first path.

13. The method of claim 12, wherein said compiling a source code region into an object code comprises delaying compilation of a source code region until said source code region is needed for execution.

14. The method of claim 12, wherein said executing said object code comprises executing said path profiling instrumentation code to determine said hot execution path.

15. The method of claim 12, wherein a hot execution path comprises a particular execution path that has been taken greater than a predetermined threshold.

16. The method of claim 12, further comprising determining which of the first path or the second path to execute based upon a path selector.

17. A method comprising:

dividing a source code into source code regions;

compiling a source code region into an object code, said compiling including placing path profiling instrumentation into said object code such that path profiling is performed for each code region;

executing said object code, said executing comprising counting taken execution paths to determine a hot execution path; and dynamically optimizing said hot execution path wherein said dynamically optimizing includes selecting a first path through the source code regions as the hot execution path and optimizing the first path; and subsequently identifying a second path as the hot execution path and optimizing the second path in response to the second path becoming more frequently used than the first path.

18. The method of claim 17, wherein said compiling a source code region into an object code occurs only after determining said source code region is necessary for execution.

19. The method of claim 17, wherein said executing said object code comprises determining said hot execution path by executing said path profiling instrumentation code.

20. The method of claim 17, further comprising selecting between the first path and the second path based upon a path selector that is determined with reference to the taken execution paths.

* * * * *